Nov. 2, 1948.         A. H. BLAU         2,452,717
WHEEL BRAKE ADJUSTING MECHANISM
Filed Oct. 10, 1945                      3 Sheets-Sheet 1

INVENTOR.
Arthur H. Blau,
BY Morsell & Morsell
ATTORNEYS.

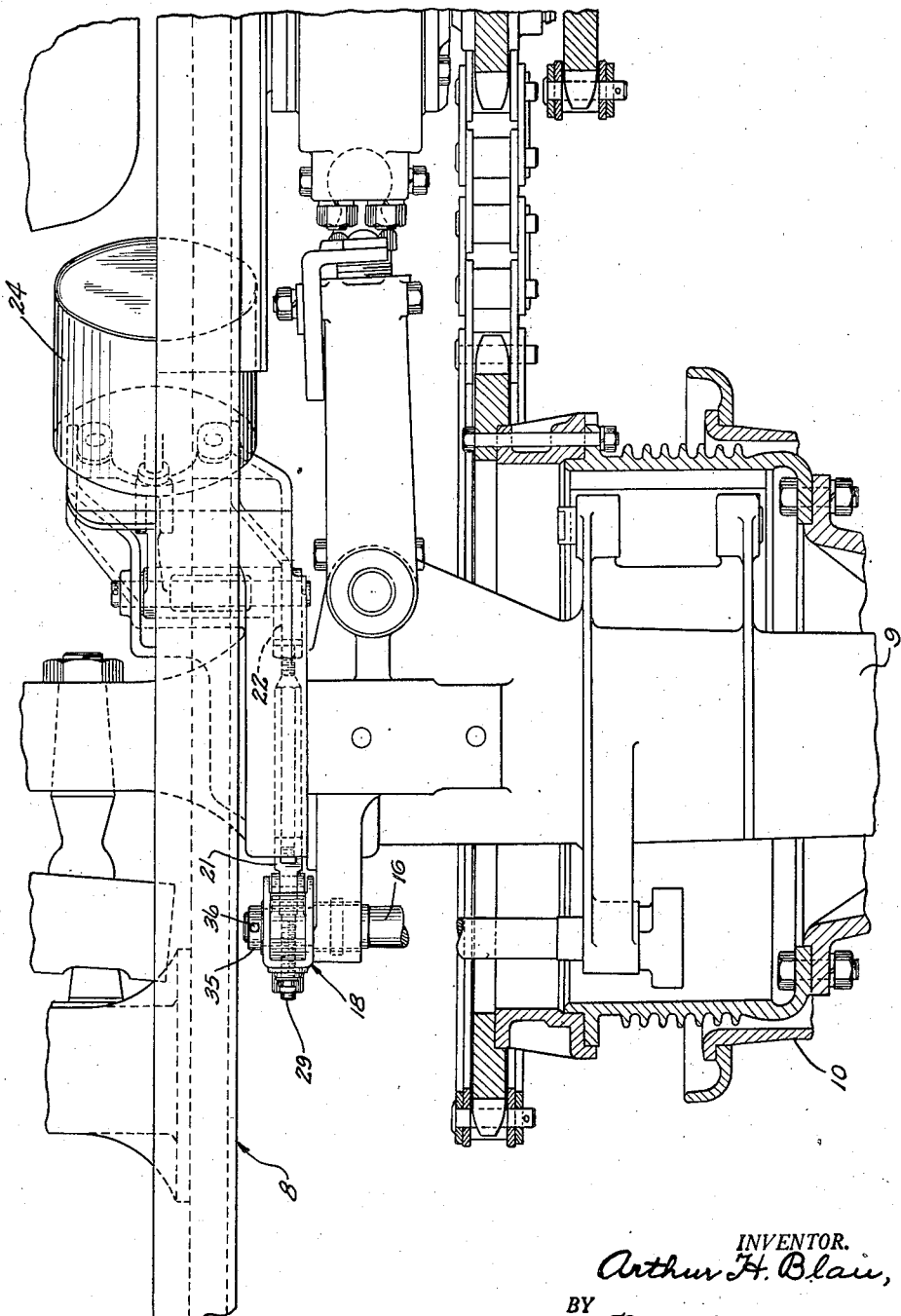

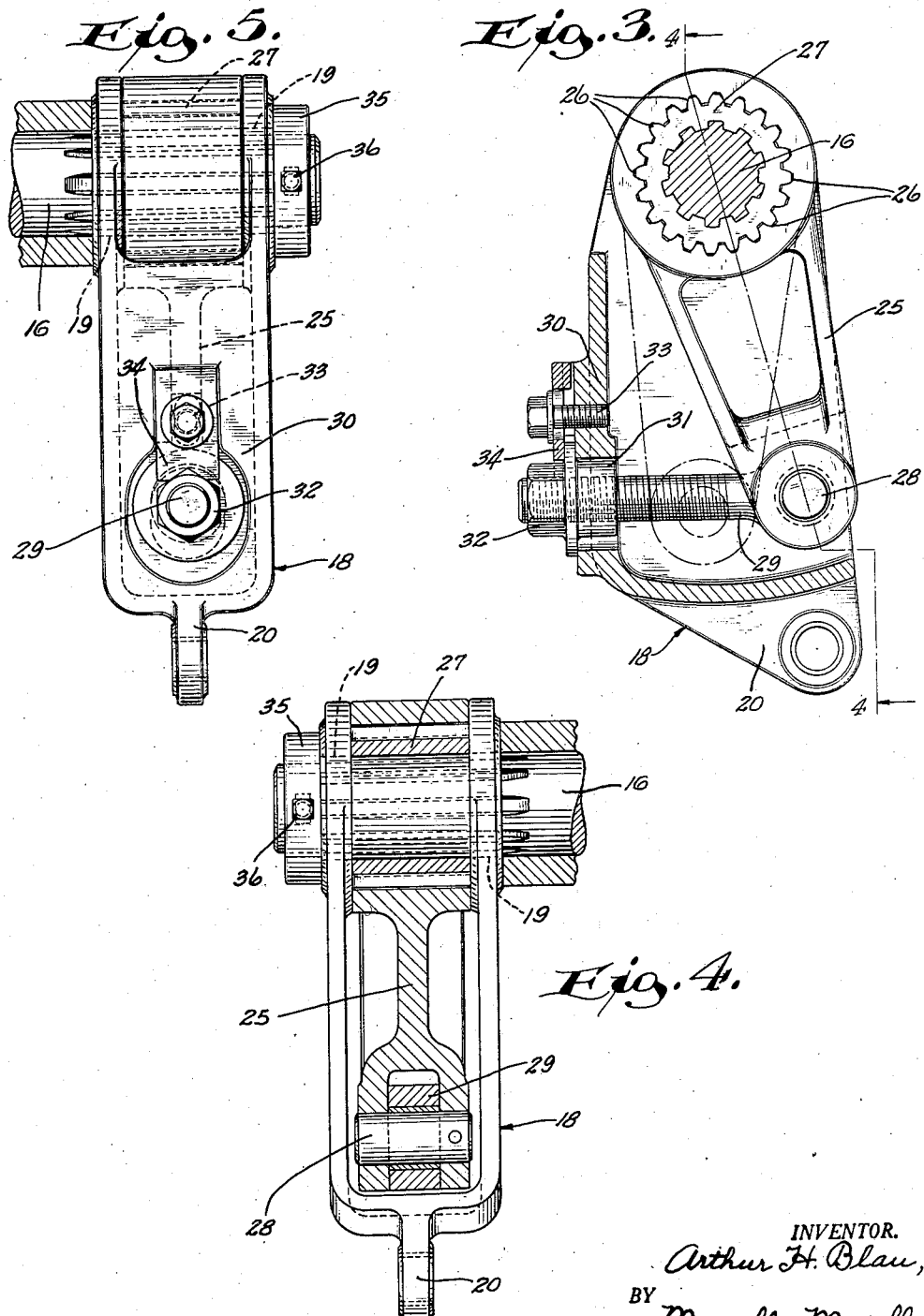

Patented Nov. 2, 1948

2,452,717

UNITED STATES PATENT OFFICE 2,452,717

WHEEL BRAKE ADJUSTING MECHANISM

Arthur H. Blau, Milwaukee, Wis., assignor to Sterling Motor Truck Company, Inc., Milwaukee, Wis., a corporation of Wisconsin Application October 10, 1945, Serial No. 621,492

4 Claims. (Cl. 74—522)

This invention relates to improvements in wheel brake adjusting mechanisms.

In the brake assemblage for heavy duty trucks and vehicles a brake shoe for a wheel is ordinarily operated through a cam which in turn is controlled by an associated lever member. In the conventional brake assemblages for heavy duty trucks and vehicles after wear in a brake lining occurs there must consequently be a longer stroke for the cam applying lever. It is objectionable to impose on the cam applying lever an unduly long stroke as it results in the loss of power and also is disadvantageous from the standpoint of requiring too long a time period for the application of the brake. In the type of brake assemblages under consideration as a brake lining wears, it has heretofore been proposed to compensatingly shift or advance the cam applying lever to eliminate the undesirable slack or time lag. However, in such structures ultimate advancement of the cam applying lever results in a condition where no further swinging movement of the lever for brake-applying purposes is possible, and this is highly objectionable because under these conditions, even though the brake lining has effective surface material remaining thereon, the brake is nevertheless ineffective for further use without a relining operation and readjustment of the cam applying lever to its original retarded position.

With the above in mind, it is a primary object of the present invention to eliminate the difficulties mentioned above in connection with conventional brake assemblages by providing an accessible adjustment for a brake cam applying lever which will readily permit said lever to be returned from an advanced position to its original retarded position whereby elimination of slack in the brake cam applying connections by advancement of said lever is retained, as is also a proper range of swinging movement for the lever, with the result that all of the effective brake lining may be used before it is necessary to replace a brake unit.

A further object of the invention is to provide a wheel brake adjusting mechanism which is of very compact form, is readily accessible for adjustments, and which prolongs the effective life of a brake lining.

A further object of the invention is to provide a wheel brake adjusting mechanism which is of very simple construction, is positive in its operation, is strong and durable, is relatively inexpensive, and is well adapted for the purposes described.

With the above and other objects in view, the invention consists of the improved wheel brake adjusting mechanism and its parts and combinations as set forth in the claims, and all equivalents thereof.

In the accompanying drawings in which the same reference characters indicate the same parts in all of the views:

Fig. 2 is a plan view of the showing in Fig. 1 with parts broken away and in section;

Fig. 3 is an enlarged vertical sectional view through the brake applying cam shaft and portions of the brake adjusting mechanism directly associated therewith;

Fig. 4 is a sectional view taken on line 4—4 of Fig. 3; and

Fig. 5 is a view at right angles to the showing in Fig. 3 with portions broken away and in section.

Figure 1:
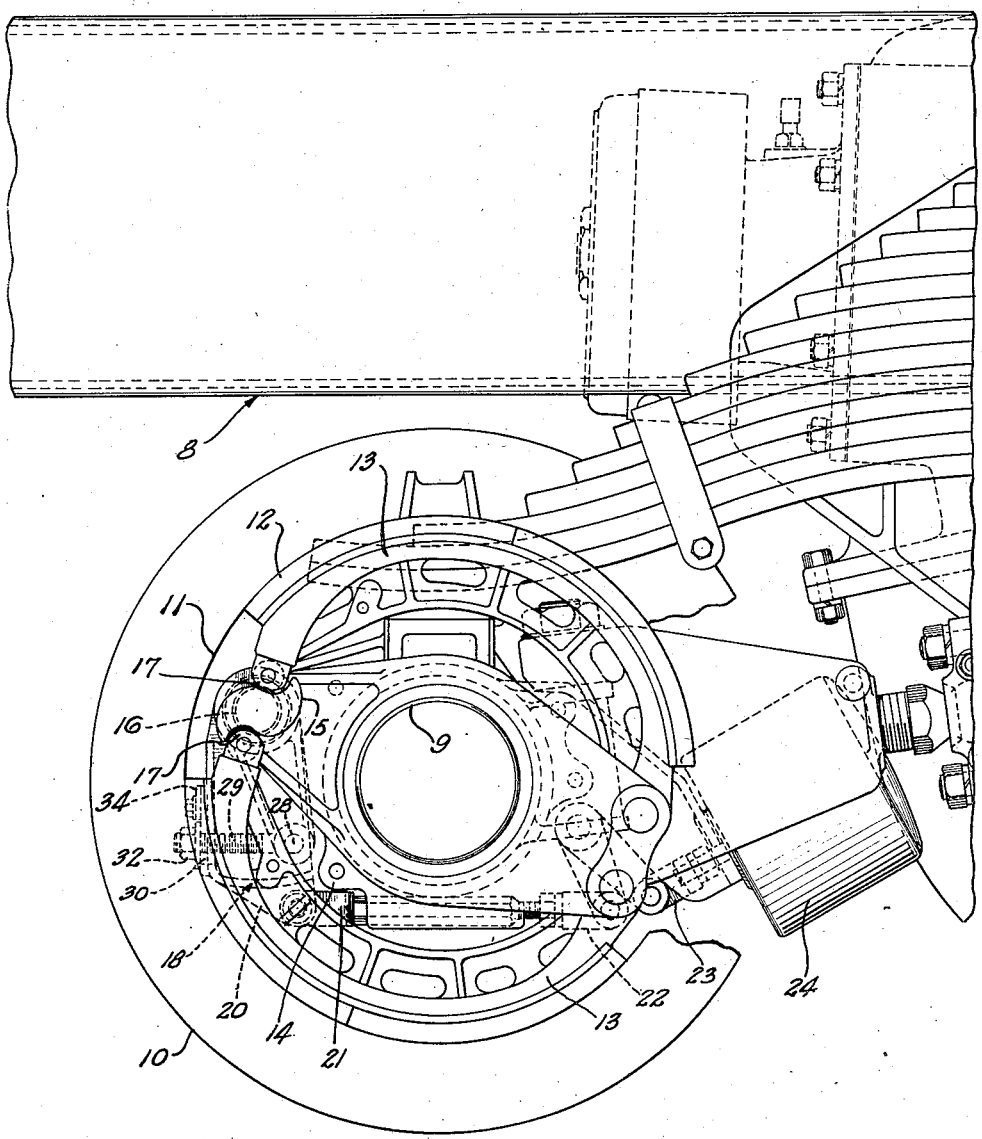
Fig. 1 is a fragmentary side view of the wheeled chassis portion of a motor truck having the improved wheel brake adjusting mechanism associated therewith.

Referring now more particularly to the drawings, it will appear that the chassis of a heavy duty vehicle, such as a motor truck, is indicated generally by the numeral 8. Said chassis includes a driving wheel-carrying rear axle 9 on which are mounted the usual driving wheels 10 carrying brake drums 11.

That portion of the assemblage to which the present invention pertains is best shown in Fig. 1, wherein a brake drum 11 provides frictional resistance surface for an annular brake lining 12 which is mounted or attached to shiftable brake shoes 13 which operate as an integral unit.

As is conventional the brake shoes 13 with lining 12 attached are intended to be expanded to frictionally contact the resistance surface of the brake drum 11 when the vehicle brake is applied, and when the brake is released, the shoes are contracted so that the brake lining does not frictionally engage the brake drum. The brake shoes and lining assembly are mounted for such movement on a brake spider 14.

Expansion and contraction of the brake shoes 13 for a wheel is effected by a cam 15 mounted fast on a transverse cam shaft 16, it being noted from Fig. 1 that the outer ends of the brake shoes 13 carry cam rollers 17 which ride on the eccentric surfaces of the cam 15. Said cam shaft 16 is journalled in bearing brackets preferably integral with the brake spider, axle, or differential housing.

The invention resides particularly in a novel wheel brake adjusting mechanism illustrated in detail in Figs. 3, 4 and 5, and in the combination of the wheel brake adjusting mechanism with the associated parts of the vehicle. The purpose of said mechanism will be appreciated from the following explanation: As has been brought out, the brake shoes 13 for applying the vehicle brake for a wheel are operated through turning movement of the cam 15 which is caused to turn in one direction or the other through oscillation of the cam shaft 16. In conventional brake assemblages for heavy duty trucks and vehicles, a lever member, carried by the cam shaft, is swung in a proper direction through various connections, and it is obvious that an unduly long swinging stroke for said lever is objectionable as it will result in the loss of power and will also require too long a time period to effect the proper application of the brake shoes. It will also be appreciated that normal operation of the vehicle brake will in time cause wear in the brake lining and to compensate for such wear, a longer stroke in the cam applying lever is required. Heretofore, it has been proposed, in order to compensate for wear in the brake lining and an accompanying unduly long stroke of the cam applying lever, to provide an arrangement whereby the cam applying lever could be shifted relative to the cam shaft to reduce its stroke and thereby eliminate the undesirable slack and timing lag. Ultimately, however, such compensating shifts of the cam applying lever will result in a condition where no further adequate swinging movement of the cam applying lever is attainable, and at this stage, even though the brake lining has effective surface material remaining thereon, the brake is nevertheless ineffective for further use without a relining operation and a readjustment of the cam applying lever to its original retarded position.

With these facts in mind, attention is now directed to Figs. 3, 4 and 5 of the drawings wherein a bracket plate-like cam applying lever is indicated generally by the numeral 18. Said lever is of bifurcated or forked formation and the spaced upper ends of the same have aligned openings 19 therein to revolubly receive a portion of the cam shaft 16 extended therethrough. The lower end portion of said lever 18 is formed with an eyed bracket 20 to which is pivotally attached the outer end of a series of motion transmitting connections 21, 22 and 23 (see Figs. 1 and 2). Said connections 21, 22 and 23 are adapted to be reciprocated by the piston of an air cylinder 24 which is controlled by an air valve located in the cab or adjacent the driver's position of the vehicle (not shown). Hence, as is conventional, the vehicle brakes are applied or released through manipulation of an air valve which operates the cylinder 24. The connections 21, 22 and 23 are thereby reciprocated in a desired direction to swing the cam applying lever 18 which is associated with the cam shaft 16. There is adjustably associated with the cam applying lever 18, an adjusting lever 25, whereby swinging movement of the lever 18 is imparted to the cam shaft 16 to turn said cam shaft and the cam 15 thereon, as will hereinafter appear.

As is best shown in Figs. 3, 4 and 5, the adjusting lever 25 is disposed between the sidearm portions of the cam applying lever 18. The upper end portion of the adjusting lever 25 is enlarged and is formed with an opening therethrough. The periphery of the stock adjacent the opening has complementary gear teeth 26 cut therein, as will appear from Fig. 3. Splined on the cam shaft 16, between the spaced sidearm portions of the cam applying lever 18 and with its teeth in engagement with the cooperating gear teeth 26 of the adjusting lever 25, is a barrel-like adapter gear 27.

The lower end portion of the adjusting lever 25 is of forked formation and carries a pin 28 on the intermediate portion of which the eyed inner end of an adjusting bolt 29 is mounted. A side face portion of the cam applying lever 18 is provided with a right angularly flanged wall portion 30 formed with an enlarged aperture 31 therein, through which the shank of the adjusting bolt 29 extends, with an outer portion of the bolt shank being threadably engaged by a flanged nut 32.

There is swingably mounted on the wall portion 30 of the lever 18, by means of a clamping bolt 33, a locking plate 34. When the bolt 33 is in tightened poistion and the plate 34 is in the position shown in Figs. 3 and 5, its notched depending end engages the flanged nut 32 to prevent turning thereof. However, if the bolt 33 is loosened to permit disengagement of the locking plate 34 relative to the nut 32, then, said nut 32 may be loosened and the adjusting bolt 29 may be shifted so as to swing the adjusting lever 25 in one direction or the other. This manipulation or adjustment becomes important when it is desired to compensate for brake-lining wear, as will hereinafter appear. On the outer end of the cam shaft 16, abutting a face portion of the lever 18, is a collar 35 which is held in position on the shaft by a set screw 36.

When the brake lining 12 is new, unworn, and of adequate thickness, a minimum amount of expansion of the brake shoes 13 is required for application of the brake with the result that a relatively short stroke of the connections 21, 22 and 23 is effective to swing the cam applying lever 18 the desired distance for proper brake application. When the brake lining is in the adequate condition mentioned, the proper adjustment of the adjusting lever 25, relative to the cam applying lever 18, is as shown in Fig. 3. It will be understood that, through the bolt 29 and the locking of the flanged nut 32, the adjusting lever 25 is anchored in its adjusted position relative to the lever 18 so that both members 25 and 18 operate as a unit. Hence, a swinging movement imparted to the cam applying lever 18 will, through the anchored adjusting lever 25, oscillate or rock the cam shaft 16 to turn the cam 15 and thereby expand or contract the brake shoes 13 relative to the brake drum 11.

During the course of operation of the vehicle the brake shoe lining 12 will gradually wear down. When such wear occurs it would ordinarily necessitate a longer stroke for the applying lever 18 and its associated connections, which, as heretofore pointed out, is objectionable. Therefore, to offset the necessity for such longer, objectionable strokes relative to said members, the cam shaft 16 may be compensatingly shifted circularly and this is accomplished by an outward adjustment of the bolt 29. Such adjustments of said bolt may be easily effected manually by releasing the locking plate 34 and turning the flanged nut 32 in a desired direction. The compensating shifting of the cam shaft 16 for wear in the brake shoe lining is accomplished without varying the normal position of the lever unit 18, as the adjusting lever 25 is in mesh with the adapter gear 27 and the latter is splined to the cam shaft 16.

Ultimately, compensating adjustments of the adjusting lever 25 relative to the main lever unit 18 may result in a condition shown in broken lines in Fig. 3 wherein no further adjustments of said lever 25 in the same direction, to compensate for brake lining wear, are possible. It is at this stage that the utility of the present invention is especially pronounced. The brake shoe lining may, at this stage, have ample effective surface material thereon, but without the present invention a relining operation and a readjustment of the cam applying lever to its original retarded position would be indicated in order to overcome undue slack in the operating connections and an undesirable time lag in the operation of the brake. However, with the present invention, this difficulty is readily overcome and the remaining effective brake shoe lining may be utilized, with an elimination of the slack in the connections through a simple manual manipulation which effects a redisposition of the adjusting lever 25 relative to the adapter gear 27 on the cam shaft 16. Such redisposition of the adjusting lever 25 will return it to its original retarded position as shown in full lines in Fig. 3. The mentioned readjustment is simply made by removing the adjusting lever 25 from the adapter gear 27 and then reengaging it with the adapter gear by a one-tooth retardation. Thereafter, as some additional wear occurs in the brake lining, the adjusting lever 25 may be advanced toward the left relative to Fig. 3, in the manner previously described, and when maximum advancement thereof is ultimately again obtained, a relocation of the lever 25 on the adapter gear can again be accomplished, and this procedure may be carried out as long as the effective surface on the brake lining warrants it.

From the foregoing description it will be seen that the improved wheel brake adjusting mechanism enhances the useful life of a wheel brake lining without imposing on the brake applying connections objectionably long strokes, or causing slack therein. The mechanism is easily adjusted and compensatingly shifted and the same is of simple, novel, and inexpensive construction.

What is claimed as the invention is:

1. A mechanism of the character described, comprising an oscillatory shaft, means for varying the oscillatory movement of the shaft for brake operating purposes commensurate with the condition of the brake mechanism, said means comprising a main lever loosely mounted on said shaft for swinging movement, a second lever angularly adjustably anchored at its outer end to the main lever, gear means providing a shiftable indexing anchorage between the inner end of said second lever and said shaft, and operating connections extending to said main lever for swinging it.

2. A mechanism of the character described, comprising an oscillatory shaft, means for varying the oscillatory movement of the shaft for brake operating purposes commensurate with the condition of the brake mechanism, said means comprising a main lever loosely mounted on said shaft for swinging movement, an adapter gear mounted fast on said shaft, a second lever angularly adjustably anchored at one end to the main lever, the other end portion of the second lever embracing the shaft and adapter gear and being formed with gear teeth complementary to and in shiftable engagement with the teeth of the adapter gear, and operating connections extending to the main lever for swinging it.

3. An adjustable and compensatory brake lever assembly, comprising an oscillatory cam shaft, means for varying the oscillatory movement of the shaft, said means comprising a main lever swingably supported on said shaft, a second lever, means for effecting an adjustable anchorage between the outer end of the second lever and the first lever, means providing a shiftable indexing anchorage between the inner end of the second lever and said shaft, including an adapter gear fast on said shaft and gear teeth on the inner end of the second lever complementary to and in shiftable engagement with the teeth of the adapter gear manipulation of the anchorage means between the outer end of the second lever and the first lever being effective to advance the second lever in one direction relative to the first lever and to oscillate the shaft in a desired direction, said indexing anchorage permitting a return of the second lever to its original position and a new engagement with the shaft without reversely oscillating the shaft, and operating connections extending to said main lever for swinging it and the second lever anchored thereto to oscillate the shaft through the second lever.

4. In a vehicle wheel brake assemblage of the type which includes a brake shoe and a cam for expanding and contracting the brake shoe, an adjustable and compensatory brake lever assembly comprising, an oscillatory cam shaft, a main lever loosely mounted on said shaft for swinging movement, an adapter gear mounted fast on said shaft, a second lever angularly adjustably anchored at its outer end to the main lever, the other end portion of the second lever embracing the shaft and adapter gear and being formed with gear teeth complementary to and in shiftable engagement with the teeth of the adapter gear whereby the second lever may be anchored on the shaft in any desired position of angular adjustment relative thereto, and operating connections extending to the main lever for swinging it.

ARTHUR H. BLAU.

REFERENCES CITED

The following references are of record in the file of this patent:

UNITED STATES PATENTS

| Number | Name | Date |
| --- | --- | --- |
| 1,088,247 | Thompson | Feb. 24, 1914 |
| 1,211,585 | Hooper | Jan. 9, 1917 |
| 1,608,605 | McDonald | Nov. 30, 1926 |
| 1,844,415 | Wilhjelm | Feb. 9, 1932 |
| 1,872,982 | La Brie | Aug. 23, 1932 |
| 1,930,728 | Ringling | Oct. 17, 1933 |
| 2,001,239 | Buckendale | May 14, 1935 |
| 2,012,011 | Keller | Aug. 20, 1935 |
| 2,015,881 | Alden et al. | Oct. 1, 1935 |
| 2,135,190 | Martin | Nov. 1, 1938 |
| 2,156,154 | Hooker | Apr. 25, 1939 |
| 2,226,662 | Humphrey | Dec. 31, 1940 |
| 2,294,974 | Freeman | Sept. 8, 1942 |